US010698495B1

(12) United States Patent
Staton et al.

(10) Patent No.: US 10,698,495 B1
(45) Date of Patent: Jun. 30, 2020

(54) INTELLIGENT GESTURE BASED SECURITY SYSTEM AND METHOD

(71) Applicant: NEWTONOID TECHNOLOGIES, L.L.C., Liberty, MO (US)

(72) Inventors: Fielding B. Staton, Liberty, MO (US); David Strumpf, Columbia, MO (US)

(73) Assignee: Newtonoid Technologies, L.L.C., Liberty, MO (US)

(*) Notice: Subject to any disclaimer, the term of this patent is extended or adjusted under 35 U.S.C. 154(b) by 0 days.

(21) Appl. No.: 15/706,298

(22) Filed: Sep. 15, 2017

Related U.S. Application Data

(63) Continuation of application No. 15/595,913, filed on May 15, 2017, now Pat. No. 9,785,250.

(51) Int. Cl.
*G06F 21/00* (2013.01)
*G06F 3/01* (2006.01)
*H04N 5/232* (2006.01)

(52) U.S. Cl.
CPC ......... *G06F 3/017* (2013.01); *H04N 5/23206* (2013.01)

(58) Field of Classification Search
CPC .......... G06F 3/017; G06F 21/31; G06F 3/012; H04N 5/23206; H04W 12/12; G06K 9/00335; G06K 9/00375; G06K 9/00389; G06K 9/00362
USPC ..................................... 340/5.51, 5.52, 5.53
See application file for complete search history.

(56) References Cited

U.S. PATENT DOCUMENTS

| | | | |
|---|---|---|---|
| 9,549,323 B2 | 1/2017 | Lee et al. | |
| 9,574,375 B2 | 2/2017 | Henderson | |
| 9,965,039 B2 * | 5/2018 | Kwon | G06F 3/017 |
| 2006/0242607 A1 * | 10/2006 | Hudson | G06F 3/04817 715/863 |
| 2008/0192005 A1 * | 8/2008 | Elgoyhen | G06F 3/014 345/158 |
| 2010/0063813 A1 * | 3/2010 | Richter | G06F 3/014 704/231 |
| 2010/0086213 A1 * | 4/2010 | Momoi | G06K 9/00369 382/195 |
| 2011/0242303 A1 * | 10/2011 | Giraud | E05B 81/78 348/77 |
| 2011/0275051 A1 * | 11/2011 | Hanina | G06F 19/3418 434/365 |
| 2012/0011575 A1 * | 1/2012 | Cheswick | G01S 19/14 726/5 |
| 2013/0271360 A1 | 10/2013 | Macdougall et al. | |

(Continued)

*Primary Examiner* — Yong Hang Jiang
(74) *Attorney, Agent, or Firm* — Avant Law Group, LLC

(57) ABSTRACT

The present disclosure includes intelligent gesture controlled security systems. A security system acts as a gateway between a user and a restricted area, whether physical or electronic. One gesture controlled security system includes a camera capable of monitoring a real time gesture, a memory operable to store data, a locking assembly having a locked state and an unlocked state, and a processor communicatively coupled to the memory, the locking assembly, and the camera. The processor is operable to utilize the camera to detect a gesture, store the detected gesture in the memory, compare the detected gesture to a stored gesture, and only upon determining that the real time gesture is within a predetermined threshold of the stored gesture, causing the locking assembly to change from the locked state to the unlocked state.

20 Claims, 10 Drawing Sheets

(56) References Cited

U.S. PATENT DOCUMENTS

| | | | |
|---|---|---|---|
| 2014/0007225 A1* | 1/2014 | Gay | G06F 21/36 726/19 |
| 2014/0208275 A1* | 7/2014 | Mongia | G06F 3/017 715/863 |
| 2014/0253471 A1* | 9/2014 | Bakalor | G06F 3/04883 345/173 |
| 2016/0179205 A1 | 6/2016 | Katz | |
| 2016/0358437 A1 | 12/2016 | Johnson et al. | |
| 2016/0370882 A1* | 12/2016 | McGrath | G06F 3/014 |

\* cited by examiner

INTELLIGENT GESTURE BASED SECURITY SYSTEM AND METHOD

RELATED APPLICATIONS

This application is a continuation application claiming priority to U.S. patent application Ser. No. 15/595,913 filed May 15, 2017, the disclosure of which is incorporated herein in its entirety by reference.

BACKGROUND

Embodiments of this disclosure relate generally to gesture controlled security systems and methods, such as physical mechanical locks and software on electronic devices utilizing a lock screen. The electronic device includes, for example, mobile phones, tablet computers, and desktop computers.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In one embodiment, a gesture controlled security system includes a camera capable of monitoring a real time gesture, a memory operable to store data, a locking assembly having a locked state and an unlocked state, and a processor communicatively coupled to the memory, the locking assembly, and the camera. The processor is operable to utilize the camera to detect a gesture, store the detected gesture in the memory, compare the detected gesture to a stored gesture, and only upon determining that the real time gesture is within a predetermined threshold of the stored gesture, causing the locking assembly to change from the locked state to the unlocked state. The stored gesture may be a series of discrete gestures to be performed within a specific time period in a specific order, and the predetermined threshold may allow variation in the precision of the discrete gestures, in the time period, and in the specific order.

In another embodiment, a security system includes a camera capable of monitoring real time gestures, a memory operable to store data, a device having a locked state and an unlocked state, an output, and a processor communicatively coupled to the camera, the memory, the device, and the output. The processor is operable to execute one or more modules in the memory to: (a) utilize the camera to detect a first gesture; (b) store the first detected gesture in the memory in association with a first prompt; (c) utilize the camera to detect a second gesture; (d) store the second detected gesture in the memory in association with a second prompt; (e) utilize the camera to detect a third gesture; (f) store the third detected gesture in the memory in association with a third prompt; (g) actuate the output to provide the first prompt; (h) use the camera to detect a fourth gesture; (i) store the fourth detected gesture in the memory; (j) compare the fourth detected gesture to the first detected gesture; (k) select a prompt from the group consisting of the second prompt and the third prompt; (l) only after determining that the fourth detected gesture is within a predetermined threshold of the first detected gesture, actuate the output to provide the selected prompt; (m) use the camera to detect a fifth gesture; (n) store the fifth detected gesture in the memory; (o) compare the fifth detected gesture to the detected gesture associated with the selected prompt; and (p) only after determining that the fifth detected gesture is within a predetermined threshold of the detected gesture associated with the selected prompt, cause the device to change from the locked state to the unlocked state.

In still another embodiment, a security system, includes a camera capable of monitoring real time gestures, a memory operable to store data, a device having a locked state and an unlocked state, an output, and a processor communicatively coupled to the camera, the memory, the device, and the output. The processor is operable to execute one or more modules in the memory to: (a) actuate the output to provide a first prompt; (b) use the camera to detect a first gesture; (c) store the first detected gesture in the memory; (d) compare the first detected gesture to a first predetermined gesture associated with the first prompt; (e) select a second prompt; (f) only after determining that the first detected gesture is within a predetermined threshold of the first predetermined gesture, actuate the output to provide the second prompt; (g) use the camera to detect a second gesture; (h) store the second detected gesture in the memory; (i) compare the second detected gesture to a second predetermined gesture associated with the second prompt; and (j) only after determining that the second detected gesture is within a predetermined threshold of the second predetermined gesture, cause the device to change from the locked state to the unlocked state.

Other embodiments provide methods of operating a security system. One such method includes the steps of: initiating a camera to input an access gesture; storing the input access gesture in memory; initiating the camera to input a real time gesture; storing the input real time gesture in the memory; comparing the stored real time gesture to the stored access gesture; and automatically releasing a lock from a locked state to an unlocked state only if the comparison determines a match greater than a preset threshold.

BRIEF DESCRIPTION OF THE DRAWINGS

FIG. 3b is a front view of the padlock implementation of FIG. 3a.

FIG. 4b perspective view of the briefcase implementation of FIG. 4a.

FIG. 5b is a front view of the mobile phone implementation of FIG. 5a.

FIG. 6b is a front view of the laptop computer implementation of FIG. 5a.

FIG. 7b is a front view of the padlock implementation of FIG. 7a.

DETAILED DESCRIPTION

Reference will now be made in detail to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments.

Figure 1:
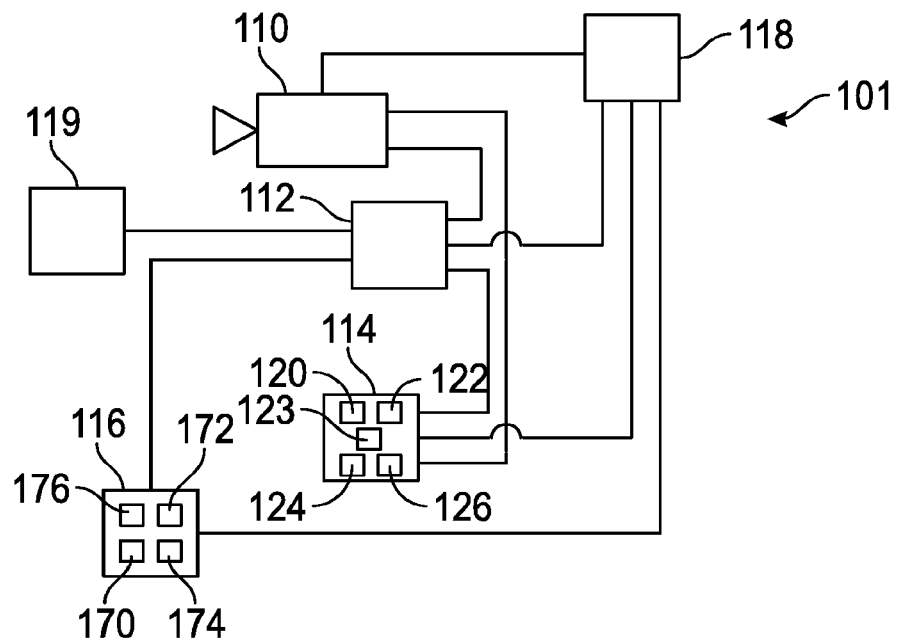
FIG. 1 is a block diagram of a gesture controlled security system according to embodiments of the present disclosure.

FIG. 1 illustrates an intelligent gesture controlled security system 101. The gesture controlled security system 101 may include a camera 110, a processor 112, memory 114, a lock assembly 116, a power source 118, and an outer housing.

The camera 110 (or "imaging module" or "optical sensor") may be set for continuous recording or record upon a trigger such as motion, and stores recorded sessions in the memory 114. The camera 110 may capture still images or video, may include filters to adjust for lighting, and may be a visible light camera or an infrared camera. The camera 110 may be connected with a network and may be accessible (e.g., via a laptop or other computer). In some embodiments, the camera 110 may have a separate housing than that of the lock assembly 116 and may be positioned separate from the lock assembly 116. Therefore, the camera 110 may be positioned to obtain the best angle of the individual or user 30 to potentially unlock the lock assembly 116. For example, the camera 110 may be positioned above a door looking down to obtain a better view of the person at the door with the lock assembly 116.

The processor 112 (or "controller" or "master board") may be any appropriate device, whether now existing or later developed, which performs the operations specified by the various programming used by the system 101. The processor 112 may be electronic circuitry located on a common chip or circuit board, or may be a distributed processor such that one portion of the processor is physically separate from another portion of the processor. In other words, discrete processing devices may be linked together (e.g., over a network) and collectively form the processor 112. While this document shall often refer to elements in the singular, those skilled in the art will appreciate that multiple such elements may often be employed and that the use of multiple such elements which collectively perform as expressly or inherently disclosed is fully contemplated herein.

The processor 112 is in data communication with the camera 110, the memory 114, and the lock assembly 116, and may further be in data communication with other peripherals 119 (e.g., sensors, keyboards, touch screens, et cetera) to control the camera 110 and other components. For example, the controller 112 may determine when to activate the camera 110 based on when a motion sensor 119 detects a nearby object. As another example, an ambient light sensor 119 may detect that there is not enough light to capture a good image, so the controller 112 may control the camera 110 to adjust for night vision, thermal, or infrared.

The memory 114 may include volatile and non-volatile memory, and any appropriate data storage devices whether now existing or later developed may be used. Further, the memory 114 may be a unitary memory in one location, or may alternately be a distributed computer memory such that one portion of the computer memory is physically separate from another portion of the non-transitory computer memory. Example memory devices which may be employed include SRAM, DRAM, EPROM, EEPROM, Flash, magnetic, rotating media, ferromagnetic, and U3 smart drives. The memory 114 is in communication with the controller 112 for providing data to and receiving data from the controller 112. In some embodiments, data may be encrypted to prevent disassembly and reverse engineering.

The memory 114 may include, for example, a program storage area (for storing software or "instructions") and a data storage area (for storing videos, still photographs, and other data). In some embodiments, the software components stored in memory 114 may include an operating system 120, a camera communication module 122 (or set of instructions for the camera 110), an I/O module 123 (or set of instructions to control peripherals 119), an imaging comparison module 124 (or set of instructions to compare real time gesture to a predetermined unlocking gesture), and a locking module 126 (or set of instructions to unlock the locking assembly 116).

The controller 112 is configured to retrieve from memory 114 and execute, among other things, instructions or modules related to the control processes and methods described herein. The controller 112 is connected to the memory 114 and may execute software instructions or modules that are stored in a RAM of the memory 114 (e.g., during execution), a ROM of the memory 114 (e.g., on a generally permanent bases), or another non-transitory computer readable medium such as another memory or a hard disc. For example, software can be stored in the internal memory of the controller board 114. The controller 112 can have part of its operations dedicated to a data transfer function between the camera 110 to the memory 114, and another part dedicated to the locking function; or can have the two functions in separate controllers (i.e., a data transfer function controller and a locking function controller).

Figure 2A:
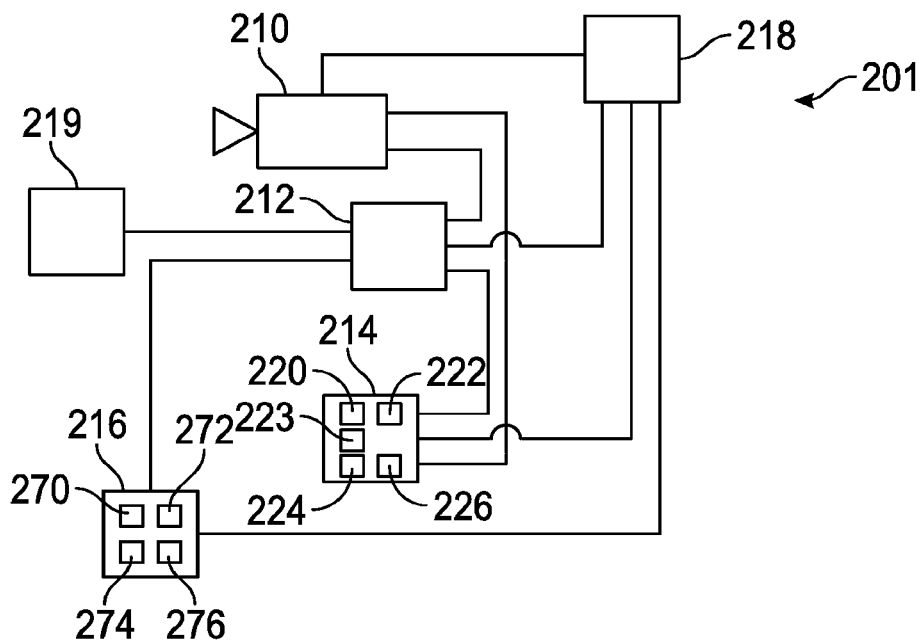
FIG. 2a is a block diagram of a door lock implementation of the gesture controlled security system of FIG. 1.
Figure 2B:
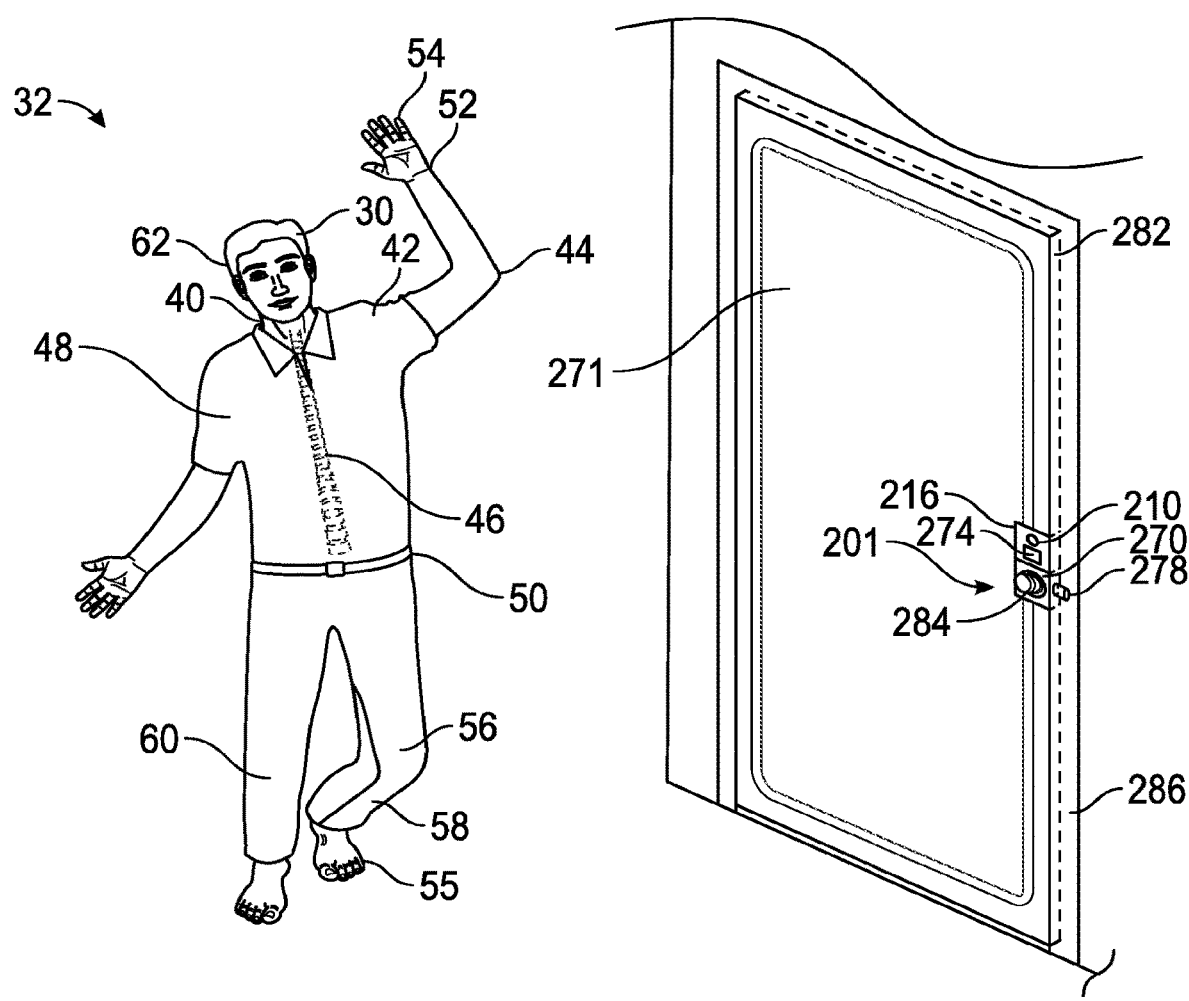
FIG. 2b is a perspective view of the door lock implementation of FIG. 2a, shown in operation with a user.

With additional reference now to FIG. 2b, the comparison module 124 determines whether a gesture 32 made by a user 36 is within a specified tolerance of a predetermined gesture 33 stored in the memory 114. In other words, the comparison module 124 can distinguish between a user's gestures 32 and a saved gesture 33 in memory 114. The gesture 32 itself may be a series of gestures, either with or without a specific order. The gestures 32 may further have a specific time delay between individual gestures, and that time delay may have a predetermined specified tolerance as well. To be clear, there may be more than one stored gesture, so the comparison module 124 may compare the real time gesture 32 being transmitted to memory 114 to a list of stored access gestures 33. The comparison module 124 then compares the real time gesture 32 to a specific access gesture, a series of gestures, or a list of stored access gestures. If the real time gesture 32 performed by the user 30 matches the stored access gesture 33 to the required degree of precision, the controller lock module 126 operates the lock assembly 116 to grant the user access to the restricted area.

The gestures 32 are created by real time movement. In some embodiments, the gestures 32 are motion of the joints in the human body. In other embodiments, the gestures 32 may be performed by animals or even non-living things (e.g., spray of an oceanic blowhole, wilting of leaves, celestial shadows, cloud cover, drone or other robotic movement, et cetera). The gestures may be performed in any appropriate environment, including for example on land or water, indoor, outdoor, underwater, in the air, in outer space, et cetera. Focusing on a human implementation, the joints may include: the neck 40, the shoulders 42, the elbows 44, the lumbar spine 46, the upper body 48, the hips 50, the wrists 52, the fingers 54, the toes 55, the knees 56, and the ankles 58. Motion of the neck 40 (cervical part of the spine) and the lumber spine 46 includes: flexion or bending forward, extension or bending backwards, lateral bending or sidewise bending, and rotation. Motion of the shoulders 42 includes: abduction or bring the arm up sideways, adduction or moving the arm inward at an angle, horizontal flexion and extension or swinging the arm horizontally, and vertical flexion and extension or swinging the arm vertically. The elbows 44 have extension (and even hyperextension), flexion and supination and pronation or the turning of the forearm out and in. The upper body 48 has flexion and extension movement. Motion of the hips 50 includes flexion, extension, abduction, and rotation (internal and external). Moving the ankle 58 slightly can allow the leg 60 to swing back a few more degrees. The wrists 52 and ankles 58 have extension and flexion or bending of the wrist/ankle traversely and radial/pronation and ulnar deviation/supination which is the seventy or so degrees that the wrists 52 can rotate. Each finger 54 and toe 55 has flexion with a small range of extension, usually with assistance. The knees 56 have flexion, extension, and a small amount of internal rotation. A gesture 32 may include one movement of a body part or several body parts, either simultaneously or in series. Gestures 32 may further include positions, such as sitting, squatting, kneeling, crouch, all fours, kicking, punching, or other positions known in the art. In some embodiments, the controller 112 may require a predetermined starting stance before the comparison module 124 is initiated.

The processor 112 may record every movement detected by the camera 110 in the memory 114 or may utilize a reset gesture, which would indicate to the controller 112 that the next real time gesture 32 is the one to be recorded, in the case of a mistaken gesture or movement. The camera 110 may be focused on a specific part of the user and only watch this specific part or parts for a gesture (e.g., the shoulder 42, the elbow 44, the wrist 52, and the fingers 54), or the camera 110 may focus on the entire body 62 of the user. Or, in some embodiments, the camera 10 may focus on a shadow or other indirect gesture. The controller 112 may not initiate the comparison module 124 unless a predetermined specific user 30 is within the field of detection of the camera 110. To this end, the controller 110 may have facial recognition software to aid in this determining, providing additional security.

The power source 118 may be located within an outer housing or may be located remotely. The power source 118 of a gesture security system 101 can be at least one or more of: batteries, a computer battery through a USB connection, a motion-based generator, a solar cell, or other source of electricity such as a fuel cell or other means known in the art. For example, the system 101 may be hard wired to an electrical box, which may provide the system 101 with the required energy (e.g., 8V to 24V, 110V, or 220V) for operation. However, it may be beneficial for the system 101 to include means for storing power, both in situations in which the system 101 is hard wired to an electrical box, and where the system receives its power from an outside source. Here, the power source 118 may for example be capacitors or a battery, such as NiCd (nickel-cadmium), NiZn (nickel-zinc), NiMH (nickel-metal hydride), or lithium-ion. The battery may be configured to receive electrical energy from the electrical box during hours when rates may be lower due to lower demand, and then use the energy during the day, when rates may otherwise be higher. Alternately, or additionally, the battery may store energy from other sources which may then be converted into electrical energy for use by the system. For example, the system may be able to capture solar energy through a photo-voltaic cell. As another example, the power source 118 may be capacitor or have a capacitor back up that receives power until fully charged, then, the capacitor provides temporary power to the system 101, such that even when the battery 118 becomes discharged, a user can still, at least momentarily, turn on the system 101 and gain access to the restricted area. The system 101 may, for example, provide an indication (e.g., a sound, a displayed message, a flashing LED, et cetera) to the user that the battery 118 is low or that the capacitor is being used and replace the power source 118 soon.

The lock assembly 116 may include a manipulatable mechanical locking mechanism or manipulatable input device 170, such as a two-position switch (i.e., locked state and unlocked state), with the controller 112 in communication with the manipulatable mechanical locking mechanism or manipulatable input device 170. The locking module 126 may provide the computer set of instructions to operate the manipulatable mechanical locking mechanism or manipulatable input device 170. Therefore, the controller 112 can control unlocking or locking of the locking assembly 116, with the locking module 126 configuring the power source 118 to send electricity or signal to manipulatable input device 170 to move the input device 170 from one state to another (i.e., locked to unlocked or vice versa).

The lock assembly 116 may also include a communication board 172. The communication board 172 includes appropriate connectors and is configured to transmit data to the controller 112. For example, the communication board 172 may include a USB connector, a microUSB connector, or other connector coupled to the controller 112. The communication board 172 may be used to configure the initial gesture settings of the gesture controlled security system 101, or to transfer information to the system 101, such as firmware updates. For example, a USB storage device or dongle (e.g., a flashdrive) may be required to initiate the gesture or gestures 32 that will be stored in the memory 114 as the unlocking gesture 32. The communication board 172 may also be used to export data from the system. For example, the stored gesture access codes for authorized users, biometrics, etc. may be copied or moved to an external USB storage device, for later transfer to, for example, another gesture controlled system.

The lock assembly 116 may further include a display 174. The user may interact with the system through the display 174, such as a touch LCD screen, to change settings and/or to request an authentication action from the controller 112 to gain access to the restricted area (i.e., as a secondary means of gaining access). The touch screen 174 itself may be locked, and the user may utilize the touchscreen 174 to replicate a pattern, to match specific pictures to each other, to input an access code to gain access to settings or attain access to the restricted area. The comparison module 124 may then perform an authentication action and compares the user's input to stored authorized actions, determining whether the user is an authorized user based on the comparison between the user's action and the stored actions. The touchscreen 174 may also be another example of a means to configure the initial gesture settings of the gesture controlled security system 101. And the touchscreen 174 may also play back the gesture 32 as a means of checking to make sure the correct gesture was captured. The touchscreen 174 may also show or display with, for example, animation or arrows indicating the tolerance to be specified to allow access, or it may show how imprecise (or "off") the gesture 32 can be to still be accepted to grant access.

The lock assembly 116 may further include biometric authorization device 176, such as a fingerprint scanner, an iris scanner, a retinal scanner, or voice recognition, or the camera 110 may utilize facial recognition. Again, the controller comparison module 124 of the controller 112 may determine whether the scan quality is sufficiently high to compare the fingerprint, retinal, or facial scan to a stored fingerprint, retinal blood pattern, iris color, or facial scan, and determines whether the user is an authorized user based on the comparison. It should be appreciated that in some embodiments the user may have to satisfy the biometric authorization 176 in addition to the comparison module 124.

Attention is now directed to FIGS. 2a and 2b, which provide a door lock implementation 201 of the system 101. The gesture controlled security system 201 includes a camera 210, a controller 212, memory 214 (having systems/module 220, 222, 223, 224, 226), a lock assembly 216 (having manipulatable input device 270, a communication board 272, a display 274, and a biometric authorization device 276), a power source 218, peripherals 219, a door 271, and a door handle 284 or push plate. The system 201 may be placed within a pre-existing door knob assembly or may be a completely separate assembly. The camera 210, controller 212, memory 214 (including systems/modules 220, 222, 223, 224, 226), lock assembly 216 (including the manipulatable input device 270, the communication board 272, the display 274, and the biometric authorization device 276), the power source 218, the peripherals 219, and other components of the system 201 are substantially similar to the counterparts in the system 101, except as specifically noted and/or shown, or as would be inherent.

The manipulatable input device 270 of the lock assembly 216 is a manipulatable mechanical locking mechanism or lock 270 configured to selectively maintain the door 271 at a closed (or "locked") position. The lock 270 includes a bolt 278 configured to selectively protrude past an edge 281 of the door 271 to secure the door 271 by entering a hole in a door frame 286. The bolt 278 may be a metal protrusion that slides in and out of the lock assembly 216 and has a throw distance (e.g., between zero and four centimeters), which can be measured as the projection of the bolt 278 from the edge 281 of the door 271.

The locking module 226 of the controller 212 can cause the bolt 278 to extend and retract relative to the edge 281 of the door 271. This may be accomplished, for example, by a motor and actuator. The controller 212 determines the operational parameters for the motor, such as, for example, the motor speed, applied voltage, turning direction, et cetera. The controller comparison module 224 determines when the lock 270 is to be released to grant access to an authorized user by performing an authentication gesture and verifying that the gesture is an authorized gesture within a predetermined tolerance. In the embodiment 201, the lock 270 may be manually or automatically locked. If an external power source is used in the embodiment 201 (e.g., 110V electricity), it may be desirable for the lock 270 to be retracted into the door frame 286 and thrown into the door 271. Alternately, power may be transmitted wirelessly (e.g., through inductive coupling) or stored in a battery in the door 271.

While FIG. 2b illustrates a door implementation appropriate for a person, it should be appreciated that other door implementations are also clearly within the scope of the current invention. For example, the door 271 may be a doggie door and the lock assembly 216 may be included without a door handle 284. In such embodiments, the animal (e.g., dog) would be required to perform the gesture to obtain the unlocked state (e.g., movement of head, lifting paw, rolling over, et cetera).

Figure 3A:
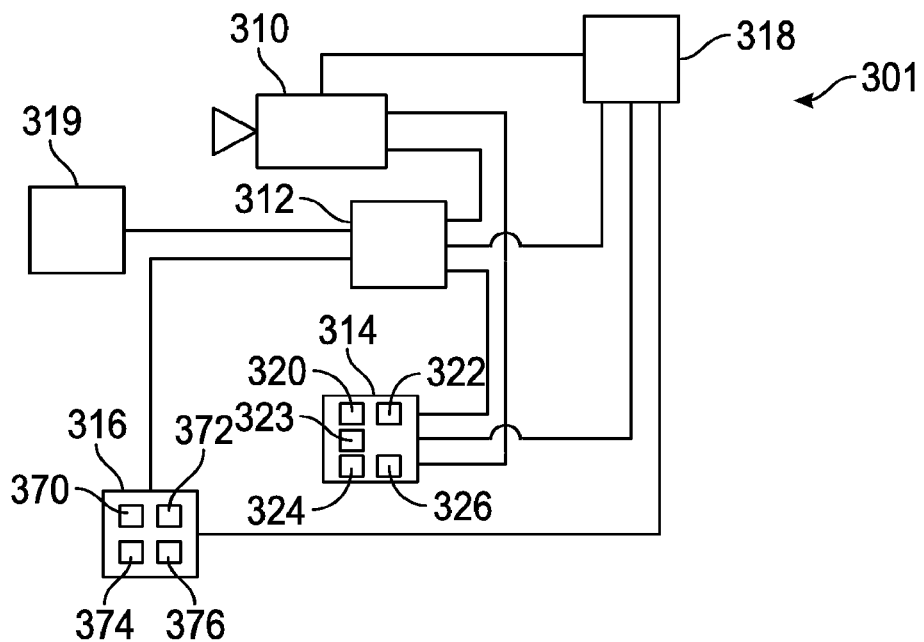
FIG. 3a is a block diagram of a padlock implementation of the gesture controlled security system of FIG. 1.
Figure 3B:
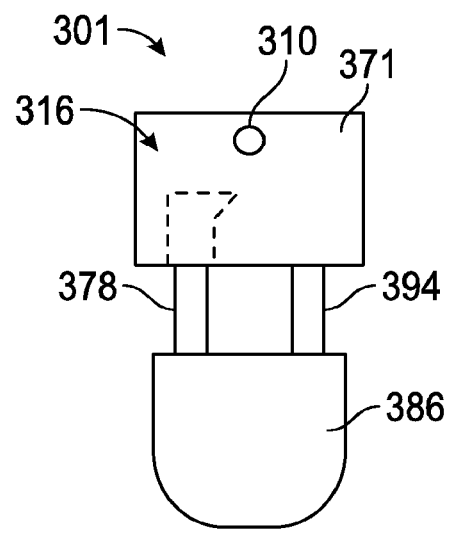

FIGS. 3a and 3b provide a padlock implementation 301 of the system 101. The gesture controlled security system 301 includes a camera 310, a controller 312, memory 314 (having systems/module 320, 322, 323, 324, 326), a lock assembly 316 (having manipulatable input device 370, a communication board 372, a display 374, and a biometric authorization device 376), a power source 318, peripherals 319, and a padlock having an upper portion 371 and a lower portion 386. The camera 310, controller 312, memory 314 (including systems/modules 320, 322, 323, 324, 326), lock assembly 316 (including the manipulatable input device 370, the communication board 372, the display 374, and the biometric authorization device 376), the power source 318, the peripherals 319, and other components of the system 301 are substantially similar to the counterparts in the system 101, except as specifically noted and/or shown, or as would be inherent.

The manipulatable input device 370 of the lock assembly 316 is a manipulatable mechanical locking mechanism or lock 370, and specifically a bolt 378, configured to selectively span between the upper portion 371 and the lower portion 386. The bolt 378 may selectively protrude into the upper portion 371 to secure the system 301 by entering a hole in the upper portion 371, and the bolt 378 has a throw distance (e.g., between zero and four centimeters). A bar 394 may couple the upper portion 371 to the lower portion 386, and may allow the lower portion 386 to be pivoted relative to the upper portion 371.

The locking module 326 of the controller 312 can cause the bolt 378 to travel relative to the upper portion 371. This may be accomplished, for example, by a motor and actuator, with the controller determining the operational parameters for the motor (e.g., motor speed, applied voltage, turning direction, et cetera). The controller comparison module 324 determines when the lock 370 is to be released to grant access to an authorized user by performing an authentication gesture and verifying that the gesture is an authorized gesture within a predetermined tolerance. In the embodiment 301, the lock 370 may be manually or automatically locked.

Figure 4A:
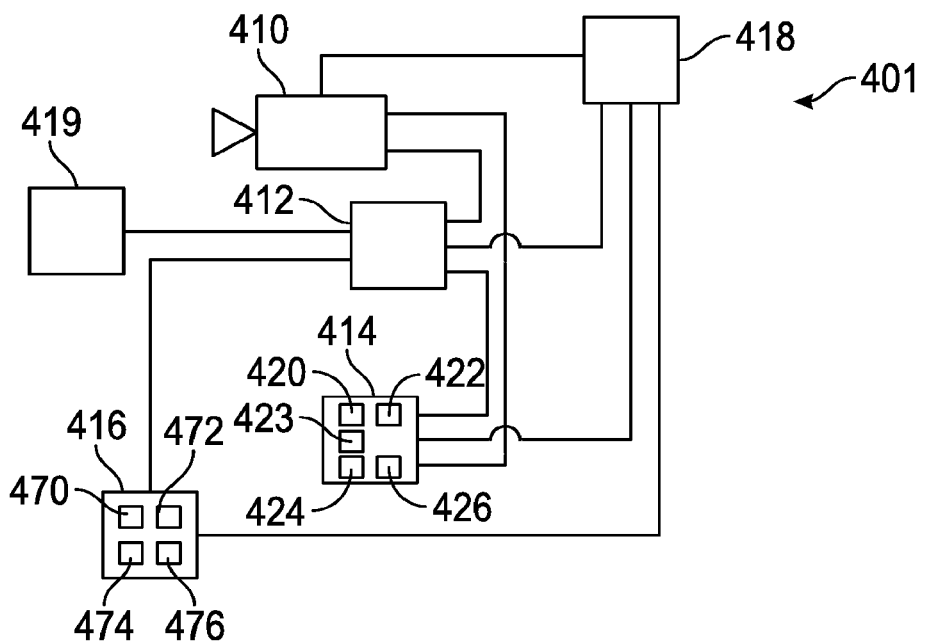
FIG. 4a is a block diagram of a briefcase implementation of the gesture controlled security system of FIG. 1.
Figure 4B:
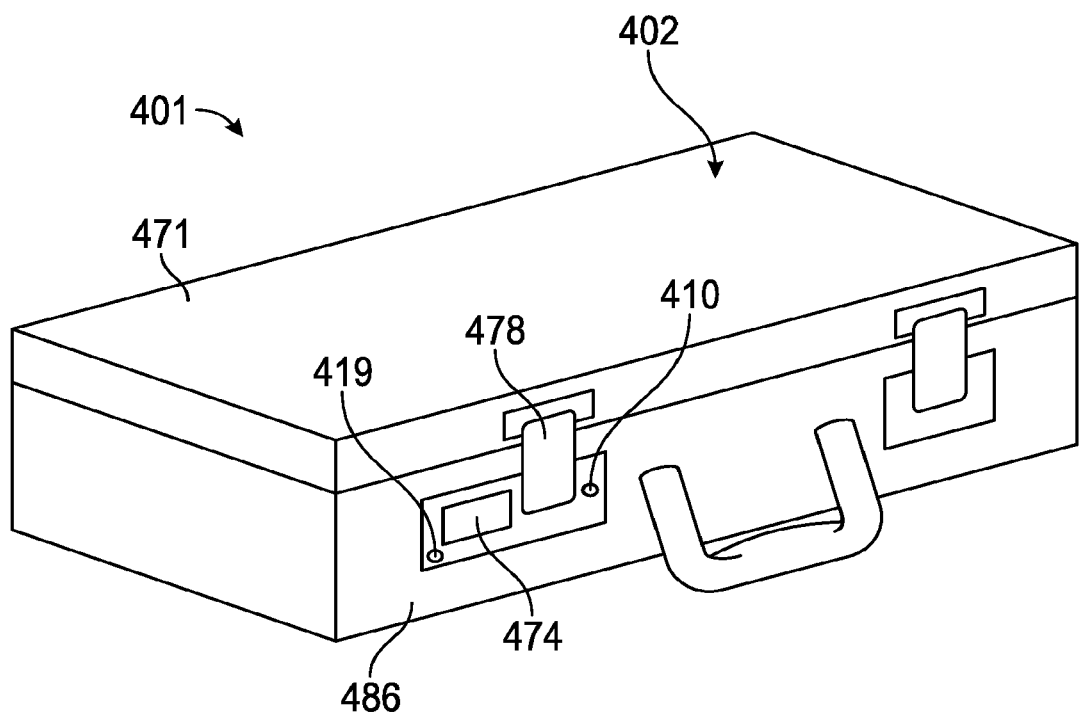

FIGS. 4a and 4b provide a briefcase implementation 401 of the system 101. The gesture controlled security system 401 includes a camera 410, a controller 412, memory 414 (having systems/module 420, 422, 423, 424, 426), a lock assembly 416 (having manipulatable input device 470, a communication board 472, a display 474, and a biometric authorization device 476), a power source 418, peripherals 419, and a briefcase 402 having one portion 471 and another portion 486. The camera 410, controller 412, memory 414 (including systems/modules 420, 422, 423, 424, 426), lock assembly 416 (including the manipulatable input device 470, the communication board 472, the display 474, and the biometric authorization device 476), the power source 418, the peripherals 419, and other components of the system 401 are substantially similar to the counterparts in the system 101, except as specifically noted and/or shown, or as would be inherent.

The manipulatable input device 470 of the lock assembly 416 is a manipulatable mechanical locking mechanism or lock 470, and specifically a latch 478, configured to selectively lock the portions 471, 486 together. The locking module 426 of the controller 412 can cause the latch 478 to unlock. This may be accomplished, for example, by a motor and actuator, with the controller determining the operational parameters for the motor (e.g., motor speed, applied voltage, turning direction, et cetera). The controller comparison module 424 determines when the lock 470 is to be released to grant access to an authorized user by performing an authentication gesture and verifying that the gesture is an authorized gesture within a predetermined tolerance. In the embodiment 401, the lock 470 may be manually or automatically locked.

The peripherals 419 may include, for example, lights, a speaker, a microphone, and a projector (e.g., holographic projector, laser projector, et cetera). Thus, the user may interact with the system 401 through visual and audible components and methods.

Figure 5A:
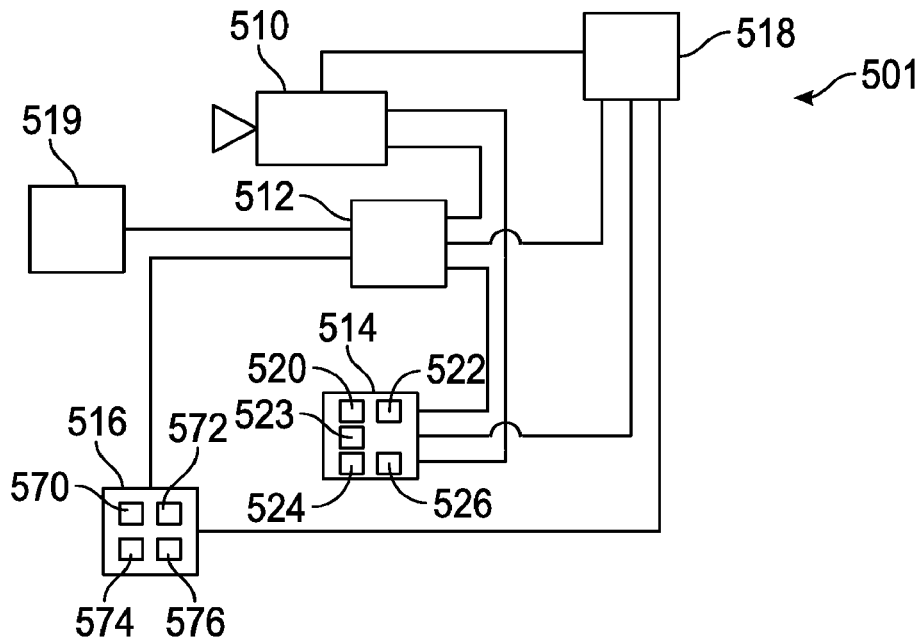
FIG. 5a is a block diagram of a mobile phone implementation of the gesture controlled security system of FIG. 1.
Figure 5B:
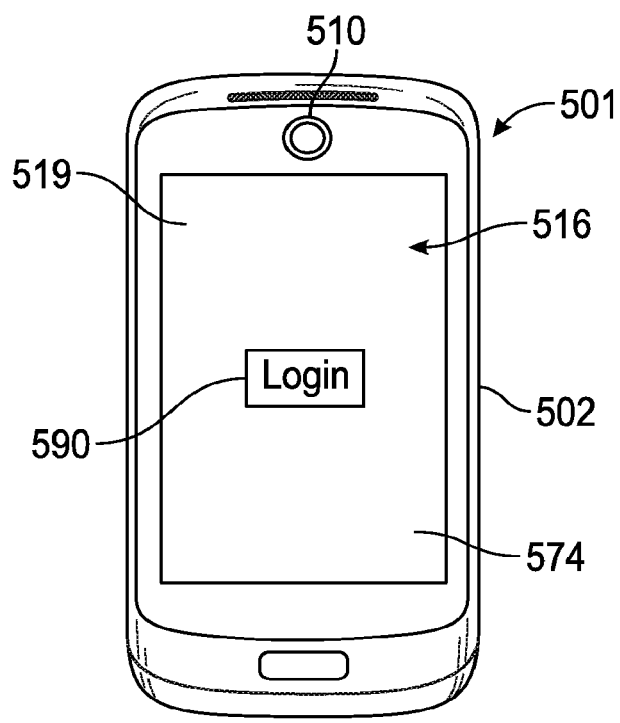

FIGS. 5a and 5b provide a mobile phone implementation 501 of the system 101. The gesture controlled security system 501 includes a camera 510, a controller 512, memory 514 (having systems/module 520, 522, 523, 524, 526), a lock assembly 516 (having manipulatable input device 570, a communication board 572, a display 574, and a biometric authorization device 576), a power source 518, and peripherals (e.g., touch screen) 519. The camera 510, controller 512, memory 514 (including systems/modules 520, 522, 523, 524, 526), lock assembly 516 (including the manipulatable input device 570, the communication board 572, the display 574, and the biometric authorization device 576), the power source 518, the peripherals (e.g., touch screen) 519, and other components of the system 501 are substantially similar to the counterparts in the system 101, except as specifically noted and/or shown, or as would be inherent.

The gesture controlled security system 501 provides selective access to all or part of the features (e.g., functions, applications, programs, routines, subroutines, et cetera) of a mobile phone 502, and may also be integrated (internally or externally) with other electronic devices (e.g., laptops, palm computers, digital cameras, tablets, desktop computers, automotive systems, watches, et cetera). If a mobile phone 502 is utilized (as shown in FIG. 5b), the system 501 may be placed within a new or pre-existing mobile phone 502 or may be a completely separate assembly. It may be particularly desirable for the gesture controlled security system 501 to include an application or program installed within the memory of the mobile phone 502. In such embodiments, the memory 514 of the system 501 and the memory of the mobile phone 502 may be one and the same.

The I/O module 523 may include instructions for the controller 512 to control the touch screen 519 and any other peripherals 519, and the I/O module 523 may display one or more buttons 590 on the touch screen 519. The user may be able to customize functionality of one or more of the buttons 590. The touch-sensitive touch screen 519 provides an input interface and an output interface between the device 502 and a user through haptic, visual, and/or tactile contact. Visual output may include graphics, text, icons, video, and any combination thereof (collectively termed "graphics"), but the locking assembly 516 selectively prevents access to further features of the mobile device 502. In some embodiments, some or all of the visual output may correspond to user-interface objects, some further details of which are described below. A quick press of the push button 590 may engage the camera 510 to initiate the comparison module 524. Thereafter, the user may make a proper real time gesture to be granted access by the locking module 526 to an unlocked phase that allows access to the mobile phone 502 functions, applications, and programs.

Figure 6A:
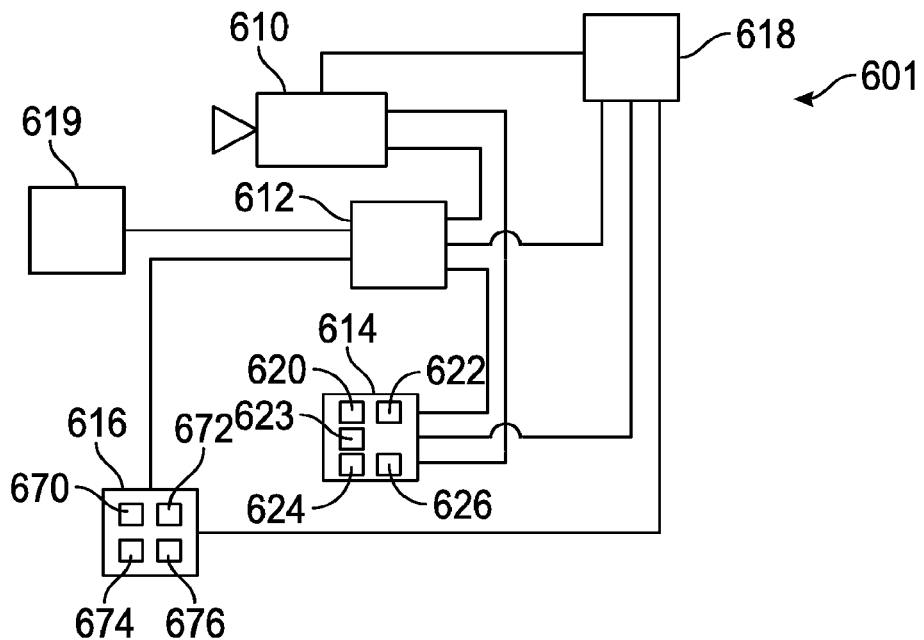
FIG. 6a is a block diagram of a laptop computer implementation of the gesture controlled security system of FIG. 1.
Figure 6B:
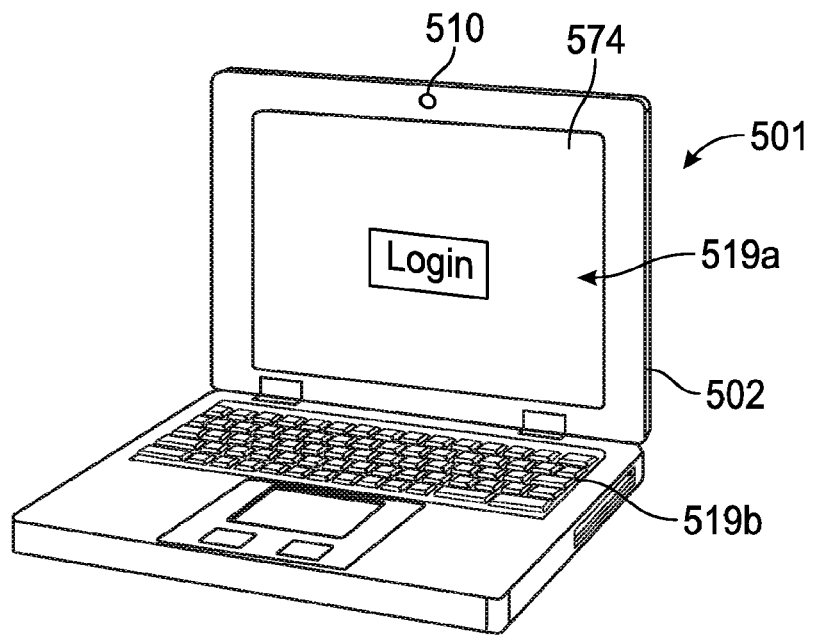

FIGS. 6a and 6b provide a laptop computer implementation 601 of the system 101. The gesture controlled security system 601 includes a camera 610, a controller 612, memory 614 (having systems/module 620, 622, 623, 624, 626), a lock assembly 616 (having manipulatable input device 670, a communication board 672, a display 674, and a biometric authorization device 676), a power source 618, and peripherals 619 (e.g., touch screen 619a and keyboard 619b). The camera 610, controller 612, memory 614 (including systems/modules 620, 622, 623, 624, 626), lock assembly 616 (including the manipulatable input device 670, the communication board 672, the display 674, and the biometric authorization device 676), the power source 618, the peripherals 619, and other components of the system 601 are substantially similar to the counterparts in the system 101, except as specifically noted and/or shown, or as would be inherent.

The gesture controlled security system 601 provides selective access to all or part of the features (e.g., functions, applications, programs) of a laptop computer 602, and may also be integrated (internally or externally) with other electronic devices (e.g., palm computers, digital cameras, tablets, desktop computers, automotive systems, watches, et cetera). If a laptop computer 602 is utilized (as shown in FIG. 6b), the system 601 may be placed within a new or pre-existing laptop computer 602 or may be a completely separate assembly. It may be particularly desirable for the gesture controlled security system 601 to include an application or program installed within the memory of the laptop computer 602. In such embodiments, the memory 614 of the system 601 and the memory of the laptop computer 602 may be one and the same.

The I/O module 623 may include instructions for the controller 612 to control the peripherals 619, and the I/O module 623 may display one or more buttons 690 on the touch screen 619a. The user may be able to customize functionality of one or more of the buttons 690. The touch-sensitive touch screen 619a and the keyboard 619b provide an input interface and an output interface between the device 602 and a user through haptic, visual, and/or tactile contact. Visual output may include graphics, text, icons, video, and any combination thereof (collectively termed "graphics"), but the locking assembly 616 selectively prevents access to further features of the laptop computer 602. In some embodiments, some or all of the visual output may correspond to user-interface objects, some further details of which are described below. A quick press of the push button 690 may engage the camera 610 to initiate the comparison module 624. Thereafter, the user may make a proper real time gesture to be granted access by the locking module 626 to an unlocked phase that allows access to the laptop computer 602 functions, applications, and programs.

Figure 7A:
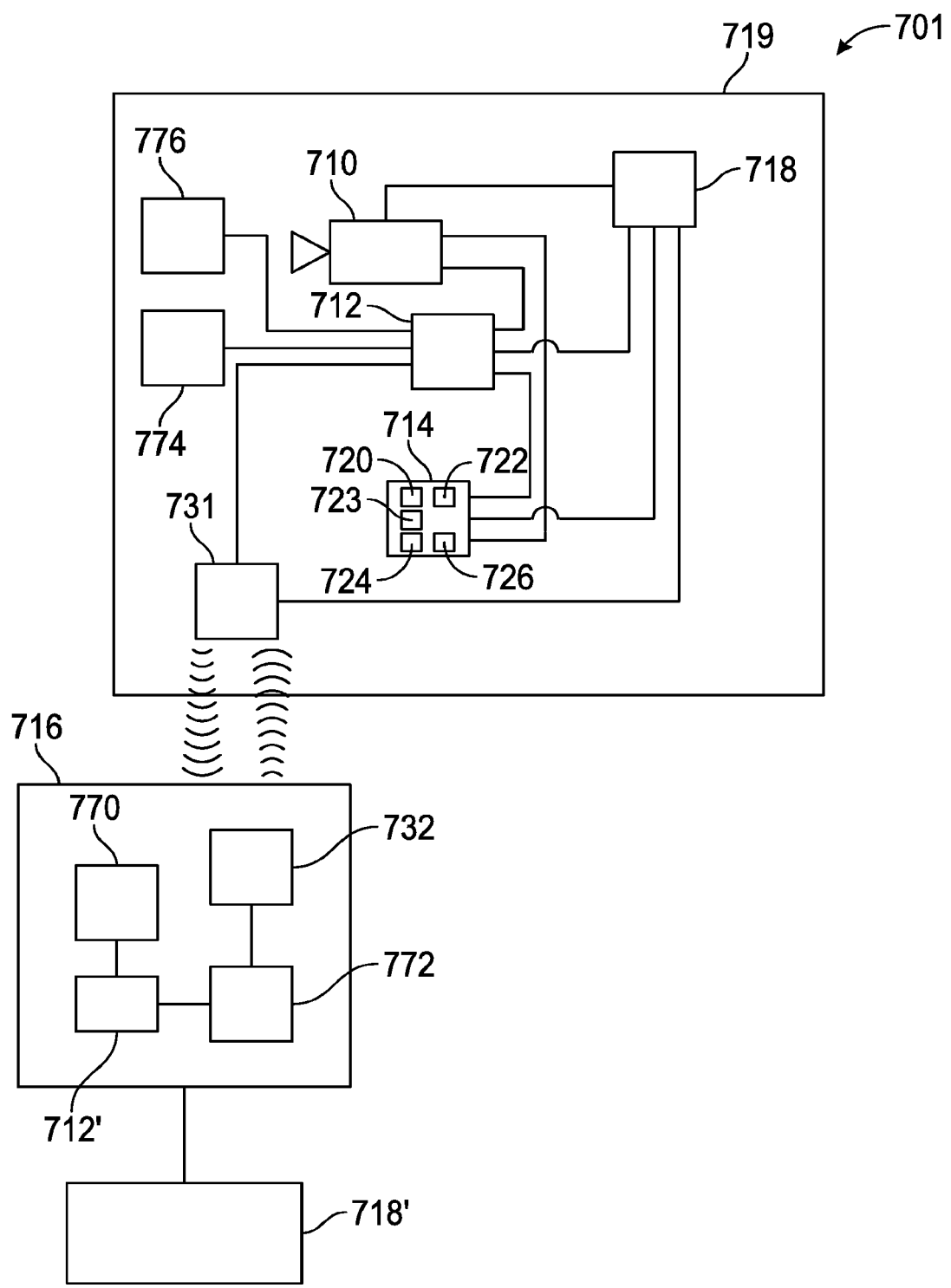
FIG. 7a is a block diagram of another padlock implementation of the gesture controlled security system of FIG. 1.
Figure 7B:
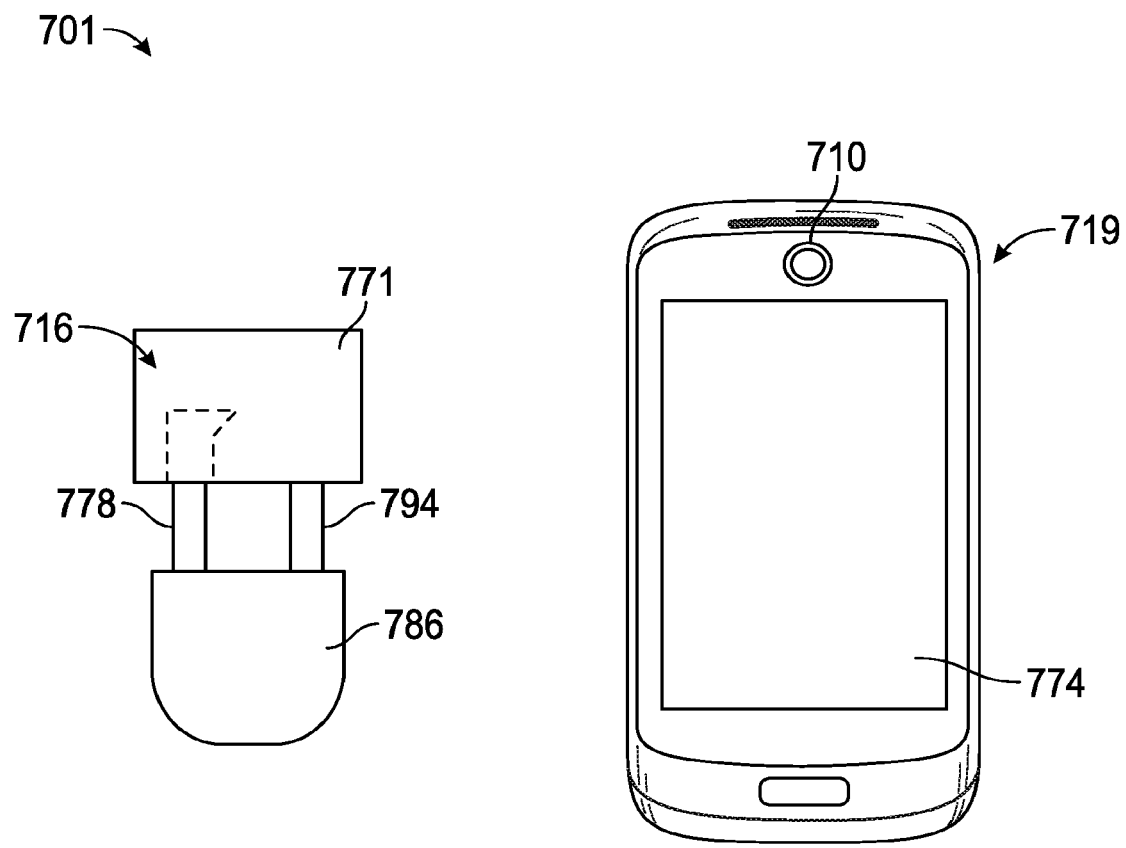

FIGS. 7a and 7b provide another padlock implementation 701 of the system 101. The gesture controlled security system 701 includes a camera 710, a distributed controller 712, 712', memory 714 (having systems/module 720, 722, 723, 724, 726), a lock assembly 716 (having manipulatable input device 770 and a communication board 772), a display 774, a biometric authorization device 776, and a distributed power source 718, 718'. The camera 710, the controller 712, 712', the memory 714 (including systems/modules 720, 722, 723, 724, 726), the lock assembly 716 (including manipulatable input device 770 and communication board 772), the display 774, the biometric authorization device 776, the distributed power source 718, 718', and other components of the system 701 are substantially similar to the counterparts in the system 301, except as specifically noted and/or shown, or as would be inherent.

The system 701 primarily differs from the system 301 in the location of various components. More particularly, the peripheral 719 in system 701 is shown as a mobile phone, and many components are housed within the mobile phone 719. However, the lock assembly 716 (including the manipulatable input device 770) is a padlock external to the mobile phone 719. The lock assembly 716 and the mobile phone 719 communicate wirelessly, through transceivers 731, 732. As with the manipulatable input device 370, the manipulatable input device 770 is a manipulatable mechanical locking mechanism or lock 770, and specifically a bolt 778 may selectively protrude into the upper portion 771 to secure the system 701 by entering a hole in the upper portion 771, and the bolt 778 has a throw distance (e.g., between zero and four centimeters). A bar 794 may couple the upper portion 771 to the lower portion 786, and may allow the lower portion 786 to be pivoted relative to the upper portion 771.

The locking module 726 can cause the bolt 778 to travel relative to the upper portion 771. This may be accomplished, for example, by a motor and actuator, with the controller 712, 712' determining the operational parameters for the motor (e.g., motor speed, applied voltage, turning direction, et cetera). The controller comparison module 724 determines when the lock 770 is to be released to grant access to an authorized user by performing an authentication gesture and verifying that the gesture is an authorized gesture within a predetermined tolerance. In the embodiment 701, the lock 770 may be manually or automatically locked.

So, in effect, the system 701 illustrates that any of the embodiments described herein may be a distributed system in which some or all of the lock assembly is physically separated from other components of the system. And those skilled in the art will additionally appreciate that the mobile phone 719 illustrated in the system 701 may itself be configured in accordance with the mobile phone 502 in the mobile phone implementation 501 discussed above, and that the mobile phone 719 may be omitted in favor of (or supplemented with) other interface devices. In some embodiments, it may be particularly desirable for the interface to include an augmented-reality or virtual reality display.

Figure 8:
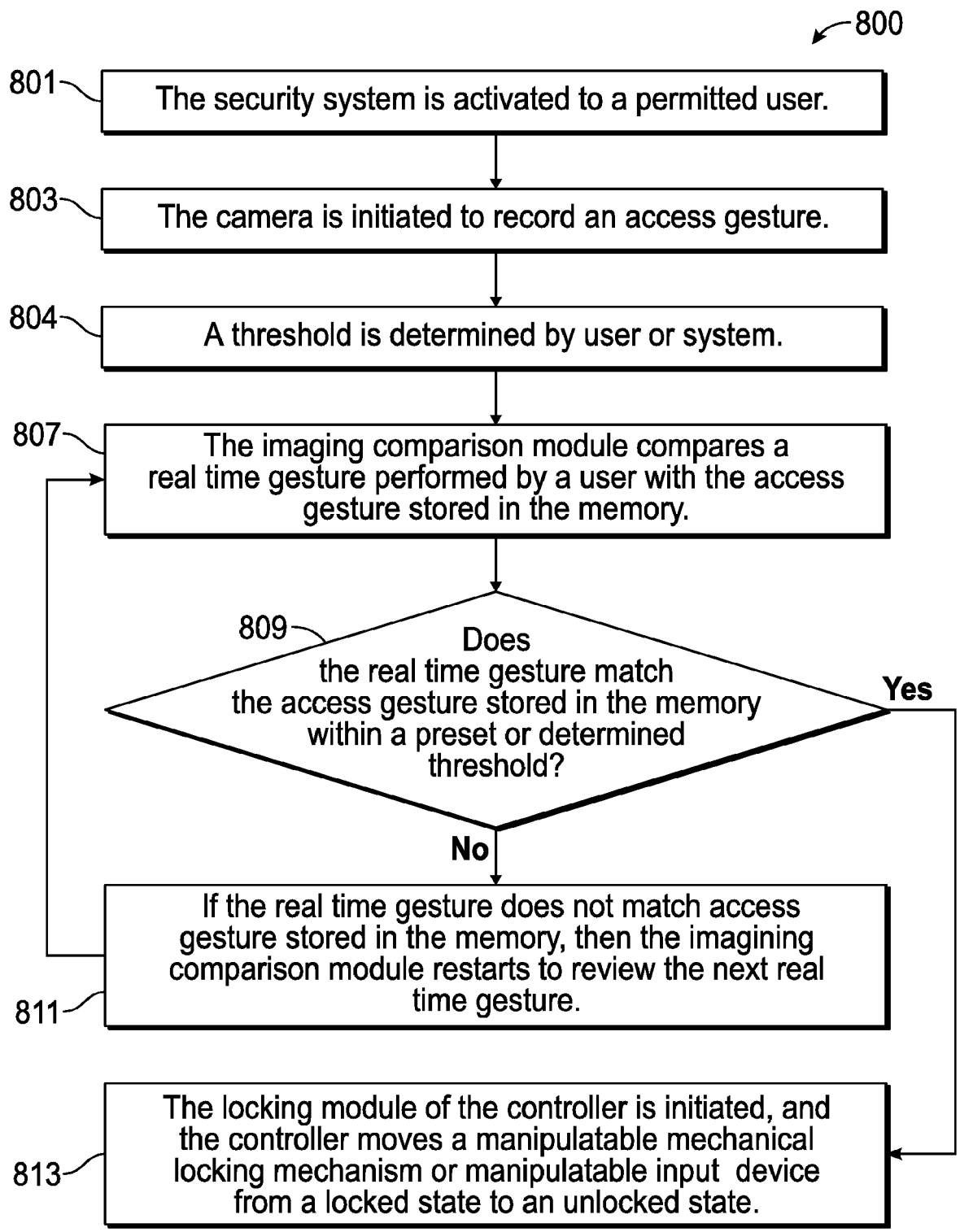
FIG. 8 is a flowchart illustrating various steps performed by gesture controlled security systems according to embodiments of the present disclosure.

FIG. 8 illustrates a method 800 that may be employed by the various systems described herein to unlock a particular device. In step 801, the security system 101 is activated to a permitted user. Such activation may be through a dongle, biometrics, login, or other means. In step 803, the camera 110 is initiated to record an access gesture 33. The controller communication module 122 turns on the camera and the access gesture is stored in memory 114. The communication module 122 opens up the connectivity between the camera 110 and the memory 114, and the controller 112 turns on the camera 110 and begins storing the recorded information in memory 114. The gesture 33 stored in memory 114 may include a time period in which to do the gesture or gestures 33 and the order of the gestures (if more than one), and this data may be used in determining a threshold.

In step 804, a threshold is determined by the user or by the system 101. The threshold may include whether a combination of real time gestures 32 must be in the specific order originally recorded or not, the precision of the gesture or gestures 32, and whether or not the gesture or gestures must be done within the original time period or some offset.

In step 807, the imaging comparison module 124 compares a real time gesture 32 performed by the user with the access gesture 33 stored in the memory 114 within the determined or preset threshold. At step 809, a decision is made whether the real time gesture 32 properly matches the access gesture 33 stored in the memory 114 or not. If not, the method 800 proceeds to step 811, where the imaging comparison module 124 returns to step 807 to review the next real time gesture 32. The imaging comparison module 124 may be constantly reviewing or require a restart gesture to begin reviewing or other means as discussed above, but it is not until the real time gesture 32 properly matches access gesture 33 that the controller 112 initiates the locking module 126. Step 811 may additionally or alternately include a subroutine that aborts the method 800. For example, after two failed attempts determined at step 809, the method 800 may proceed to a lockout step for a predetermined amount of time, and from the lockout step to step 801.

If there is a sufficient match at step 809, the process 800 continues to step 813. At step 813, the locking module 126 of the controller 112 is initiated, and the controller 112 causes the locking mechanism 116 to move from a locked state to an unlocked state. With this step 813, the locking assembly 116 becomes unlocked and the method 800 ends.

Figure 9:
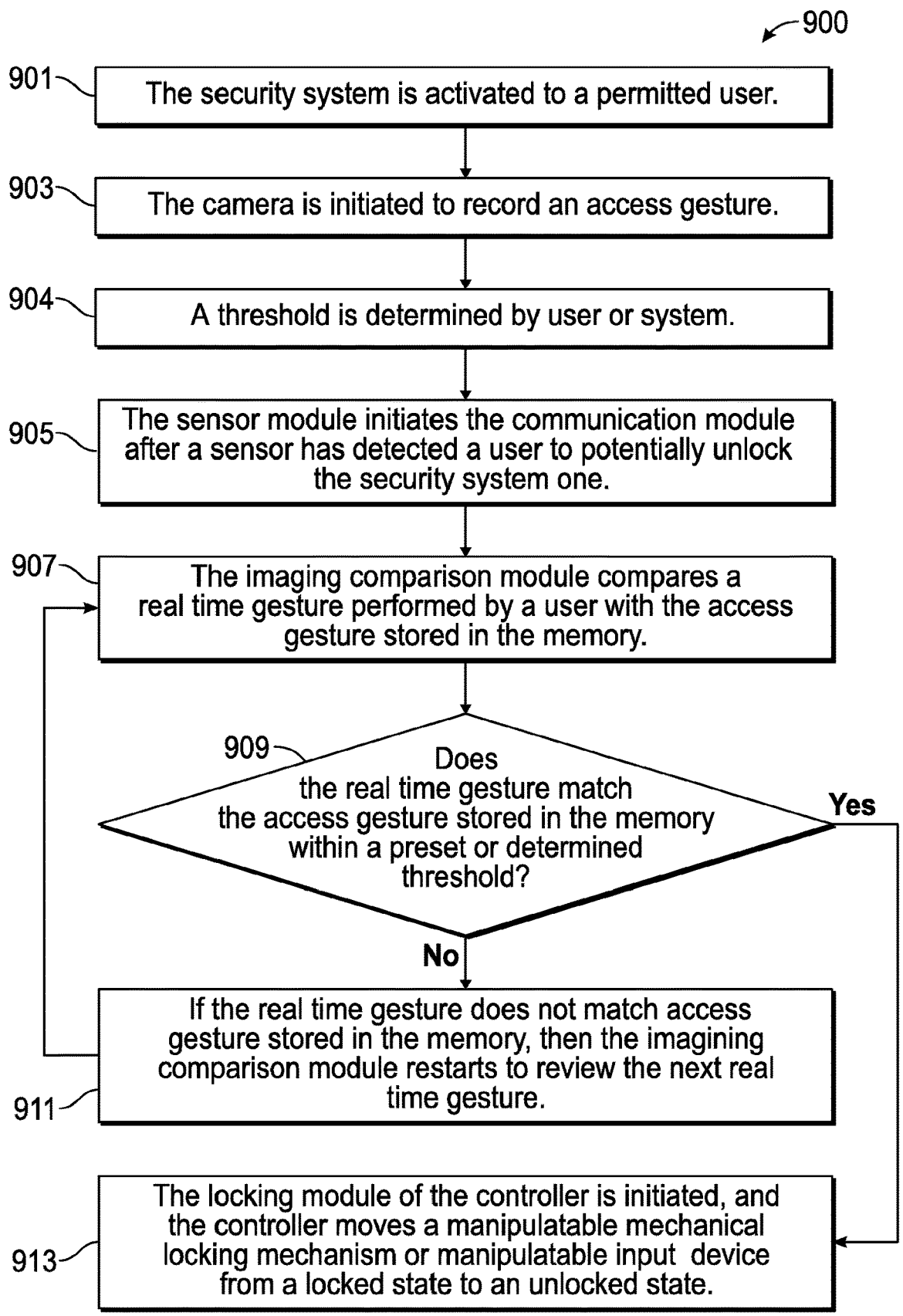
FIG. 9 is another flowchart illustrating various other steps performed by gesture controlled security systems according to embodiments of the present disclosure.

FIG. 9 illustrates another method 900 that may be employed by the various systems described herein to unlock a particular device. In step 901, the security system 101 is activated to a permitted user. Such activation may be through a dongle, biometrics, login, or other means. In step 903, the camera 110 is initiated to record an access gesture 33. The controller communication module 122 turns on the camera 110, and the access gesture 33 is stored in memory 114. The communication module 122 opens up the connectivity between the camera 110 and the memory 114, and the controller 112 turns on the camera 110 and begins storing the recorded information in memory 114. The gesture 33 stored in memory 114 may include the time period in which to do the gesture or gestures 33 and the order of the gestures 33 if more than one is desired, as well as data to be used in determining the threshold.

In step 904, a threshold is determined by the user or is preset by the system 101. The threshold may include whether a combination of real time gestures 32 must be in the specific order originally recorded or not, the precision of the gesture or gestures 32, and whether or not the gesture or gestures 32 must be done within the original time period or some offset.

In step 905, the sensor module 123 initiates the communication module 122 after a sensor 119 has detected a user to potentially unlock the security system 101. The sensor 119 may be, for example, a motion (e.g., passive infrared), optical or camera, light, or sound (e.g., microphone) sensor, or a combination thereof. The sensor module 123 communicates with the controller 112 to initiate the camera 110 to begin recording to the memory 114.

In step 907, the imaging comparison module 124 compares a real time gesture 32 performed by the user with the access gesture 33 stored in the memory 114 within the determined or preset threshold. At step 909, a decision is made whether the real time gesture 32 properly matches the access gesture 33 stored in the memory 114 or not. If not, the method 900 proceeds to step 911, where the imaging comparison module 124 returns to step 907 to review the next real time gesture 32. The imaging comparison module 124 may be constantly reviewing or require a restart gesture to begin reviewing or other means as discussed above, but it is not until the real time gesture 32 properly matches access gesture 33 that the controller initiates the locking module 126. Step 911 may additionally or alternately include a subroutine that aborts the method 900. For example, after two failed attempts determined at step 909, the method 900 may proceed to a lockout step for a predetermined amount of time, and from the lockout step to step 901.

If there is a match at step 909, the process 900 continues to step 913. At step 913, the locking module 126 of the controller 112 is initiated, and the controller 112 causes the locking mechanism 116 to move from a locked state to an unlocked state. With this step 913, the locking assembly 116 becomes unlocked and the method 900 ends.

As noted above, various structural implementations and methods of the current invention may require a series of gestures 32 to be performed to obtain an unlocked state, and sometimes in a predetermined order known to the user. In other structural implementations and methods of the current invention, interactive successive encryption may be used. There, no complete successive gesture sequence is stored in memory 114 as a complete script. Instead, portions are stored as sequences that may be dynamically re-ordered by the system 101. As an example, a green light provided by the display 174 (or a song clip provided by a speaker 119, or another informative output or "prompt") may indicate that one particular sequence of gestures 32 must be performed. After that sequence of gestures 32 is correctly performed, a red light provided by the display 174 (or another song clip provided by speaker 119, or another informative output) may indicate a different particular sequence of gestures 32 that must be performed. The order of the chosen sequences may be randomly selected on the fly, or may be chosen based on user performance. For example, if during the first sequence the user performs gestures 32 with a high level of precision except gestures requiring movement of the knees 56 and ankles 58, the subsequent sequence may be selected to minimize (or maximize) the required movements of the knees 56 and ankles 58. And various prompts may be selected to be purposefully deceptive. For example, a clip of the song "YMCA" may be played as the prompt, and performance of the "moonwalk" dance move (instead of the "YMCA" dance move) may be required to obtain the unlocked state. In some embodiments, it may be particularly desirable for the implementation to move to a lockout step immediately upon detecting a particular response to a purposefully deceptive prompt (e.g., the intuitive response, such as performing the "YMCA" dance move after the "YMCA" prompt). Moreover, gesture sequences may be accompanied (again, either with or without particular sequencing) by other security keys, such as voice recognition, facial recognition, et cetera.

Those of skill in the art shall recognize that the camera may be configured to realize images or movements in 1-D, 2-D, or 3-D space. If the camera is configured to recognize movements in only a single dimension, the user may be somewhat limited in the movements that may be recorded and used for security purposes. For example, the user may be limited to movements that occur along a line (e.g., horizontally or vertically). In 2-dimensions, the camera may be configured to recognize movements that occur both horizontally and vertically. In both 1- and 2-dimensions, the user may be required to face the camera nearly head-on such that the camera can accurately see the movements of the user in order to compare against the sequence required to achieve the unlocked state. However, in embodiments, multiple cameras may be utilized in order to realize movements of the user in 3-dimensions. For example, utilizing two cameras pointing in the same direction with fixed spacing between the cameras, the two camera images can be used to extract depth of view utilizing stereoscopic image processing techniques. Although stereoscopic viewing can yield depth and position information, this technique is limited to a single point of perspective meaning that objects may be hidden from the viewpoint of the stereoscopic view. This can block critical visual gesture information and limit the ability to identify an intended gesture by the user. One of the limitations of stereoscopic image processing is that there is only a sign using the images from the multiple cameras, the system may be able to capture a 3D map of the environment. Additionally, the system may be able to capture movements of the user in 3-dimensions.

In one embodiment, using marking techniques for 3D mapping known to those of skill in the art, a single camera may be utilized to create a 3D map of the environment. One technique of 3D mapping can be realized within a room environment by placing three (or more) cameras that are viewing a common area where the cameras are positioned symmetrically in a 120 degree angle of camera position from the center of the room or viewing area. The multiple images are synchronized in time to provide 3D image information that has no obstructions and additionally contains vectored images that are possible to calculate vectors and positioning for any patterns of interest within the viewing field(s). Additional object location, precision, and accuracy can be improved for every additional camera that is providing a relevant image angle suite. For example, if a person is moving their hand from left-to-right while rotating their body in circles, the multiple cameras can provide enough visual information in order to process and resolve positions of the hand movements as well as body position continuously regardless of their relative position to the other objects within the room. The multiple time-synchronized images are used to calculate vector positions of objects that are acquired and processed within a common viewing field defined as 3D spatial mapping vectors. A specific product example is a 3-D camera, such as the ZED™ camera developed by Stereolabs, may be configured to recognize space and movements in three-dimensions using known 3D mapping techniques. The camera may thus be capable of recognizing a user's movements without the user having to stand directly in front of the camera. Further, the user may record movement sequences in three-dimensions which are more difficult to achieve (e.g., requiring movement in the x, y, and z directions), potentially resulting in heightened security. When the user approaches the camera, the camera may compare the movements of the user in 3-dimensional space and compare it against the stored movement sequences. If the user's movements are sufficiently similar to those stored in the system, then the system may move to the unlocked state as described herein.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. Further, it will be understood that certain features and subcombinations may be of utility and may be employed within the scope of the disclosure. Further, various steps set forth herein may be carried out in orders that differ from those set forth herein without departing from the scope of the present methods. This description shall not be restricted to the above embodiments. It is to be understood that while certain forms of the present invention have been illustrated and described herein, it is not to be limited to the specific forms or arrangement of parts described and shown.

The invention claimed is:

1. A security system, comprising:
a camera capable of monitoring a real time gesture;
a memory operable to store data;
a locking assembly having a locked state for securing access to a restricted area and an unlocked state for providing access to the restricted area to an authorized user; and
a processor communicatively coupled to the memory, the locking assembly, and the camera; the processor operable to execute one or more modules in the memory to: (a) utilize the camera to detect a gesture from the authorized user; (b) store the detected gesture in the memory; (c) compare the detected gesture to an unlock gesture, wherein the unlock gesture is stored in memory from a first previously recorded gesture performed by the authorized user; (d) upon determining that the detected gesture is within a predetermined threshold of the unlock gesture, causing the locking assembly to change from the locked state to the unlocked state; (e) upon determining that the detected gesture is not within the predetermined threshold of the unlock gesture, requiring a reset gesture, wherein the reset gesture is stored in memory from a second previously recorded gesture performed by the authorized user; and (f) upon determining that the reset gesture has been made by the authorized user, the processor repeats steps (a) through (f).

2. The security system of claim 1, wherein the camera is at least one item selected from the group consisting of a still camera, motion camera, and infrared camera.

3. The security system of claim 1, wherein the change in the locking assembly from a locked state to an unlocked state allows access to contents of an electronic device.

4. The security system of claim 1, wherein the locking assembly includes at least one item selected from the group consisting of a latch, a pad lock, and a door handle.

5. The security system of claim 1, wherein the unlock gesture is a series of discrete gestures to be performed within a specific total time period.

6. The security system of claim 1, wherein the unlock gesture is a series of discrete gestures to be performed within a specific time period in a specific order; and wherein the predetermined threshold includes deviation in the precision of the discrete gestures, in the time period, and in the specific order.

7. The security system of claim 1, wherein the camera monitors at least one specific body part selected from the group consisting of the following: hand, leg, central core, hips, and shoulders.

8. The security system of claim 1, wherein the camera is located remote from the processor and in communication with the processor through a network.

9. The security system of claim 1, wherein the unlock gesture includes motion selected from the group consisting of the following joints: neck, shoulders, elbows, lumbar spine, upper body, hips, wrists, fingers, toes, knees, and ankles.

10. The security system of claim 1, wherein the processor requires a user to be in a starting stance to execute one or more modules.

11. The security system of claim 1, wherein the processor requires identification of a specific user to execute the one or more modules.

12. The security system of claim 11, wherein the specific user identification is determined using the camera and facial recognition software.

13. The security system of claim 1, further comprising a sensor in communication with the processor, and wherein the processor requires data from the sensor to execute the one or more modules.

14. The security system of claim 1, further comprising a communication device to send and receive information from an outside source to and from at least one of the processor and the memory.

15. The security system of claim 1, further comprising a display.

16. The security system of claim 1, wherein the locking assembly further includes a biometric authorization device.

17. A security system, comprising:
a camera capable of monitoring a real time gesture;
a memory operable to store data;
a locking assembly having a locked state for securing access to a restricted area and an unlocked state for providing access to the restricted area to an authorized user; and
a processor communicatively coupled to the memory, the locking assembly, and the camera; the processor operable to execute one or more modules in the memory to: (a) utilize the camera to detect a gesture from the authorized user; (b) store the detected gesture in the memory; (c) compare the detected gesture to an unlock gesture, wherein the unlock gesture is stored in memory from a previously recorded gesture performed by the authorized user; and (d) only upon determining that the detected gesture is within a predetermined threshold of the unlock gesture, causing the locking assembly to change from the locked state to the unlocked state;
wherein:
the unlock gesture is a series of discrete gestures that are each stored as a portion of a sequence that is dynamically re-ordered by the security system; and
the dynamic re-ordering of the sequence of discrete gestures includes requiring a second discrete gesture that is chosen by the processor based on a first discrete gesture detection.

18. The security system of claim 17, wherein each sequence portion is assigned to at least one item selected from the group consisting of a color prompt and a sound prompt, and is displayed during at least one time selected from the group consisting of prior to the camera being utilized to detect a gesture and at the same time as the camera is utilized to detect a gesture.

19. A security system, comprising:
a camera capable of monitoring a real time gesture;
a memory operable to store data;
a locking assembly having a locked state for securing access to a restricted area and an unlocked state for providing access to the restricted area to an authorized user; and
a processor communicatively coupled to the memory, the locking assembly, and the camera; the processor operable to execute one or more modules in the memory to:
(a) utilize the camera to detect a gesture from the authorized user; (b) store the detected gesture in the memory; (c) compare the detected gesture to an unlock gesture, wherein the unlock gesture is stored in memory from a first previously recorded gesture performed by the authorized user; (d) upon determining that the detected gesture is within a predetermined threshold of the unlock gesture, causing the locking assembly to change from the locked state to the unlocked state; (e) upon determining that the detected gesture is not within the predetermined threshold of the unlock gesture, requiring a reset gesture, wherein the reset gesture is stored in memory from a second previously recorded gesture performed by the authorized user; and (f) upon determining that the reset gesture has been made by the authorized user, the processor repeats steps (a) through (f);
wherein the predetermined threshold is user selectable.

20. A security system, comprising:
a camera capable of monitoring a real time gesture;
a memory operable to store data;
a locking assembly having a locked state for securing access to a restricted area and an unlocked state for providing access to the restricted area to an authorized user; and
a processor communicatively coupled to the memory, the locking assembly, and the camera; the processor operable to execute one or more modules in the memory to: (a) utilize the camera to detect a gesture from the authorized user; (b) store the detected gesture in the memory; (c) compare the detected gesture to an unlock gesture, wherein the unlock gesture is stored in memory from a previously recorded gesture performed by the authorized user; and (d) only upon determining that the detected gesture is within a predetermined threshold of the unlock gesture, causing the locking assembly to change from the locked state to the unlocked state;
wherein:
the predetermined threshold is user selectable;
the unlock gesture is a series of discrete gestures that are each stored as a portion of a sequence that is dynamically re-ordered by the security system; and
the dynamic re-ordering of the sequence of discrete gestures includes requiring a second discrete gesture that is chosen by the processor based on a first discrete gesture detection.

* * * * *